United States Patent
Ito et al.

(10) Patent No.: US 6,799,456 B2
(45) Date of Patent: Oct. 5, 2004

(54) THERMAL FLOW SENSOR

(75) Inventors: Akihiro Ito, Kasugai (JP); Yoshihiko Kawai, Kasugai (JP)

(73) Assignee: CKD Corporation, Komaki (JP)

( * ) Notice: Subject to any disclaimer, the term of this patent is extended or adjusted under 35 U.S.C. 154(b) by 0 days.

(21) Appl. No.: 10/372,861

(22) Filed: Feb. 26, 2003

(65) Prior Publication Data

US 2004/0163463 A1 Aug. 26, 2004

(51) Int. Cl.⁷ .................................................. G01F 1/68
(52) U.S. Cl. .................................................. 73/204.26
(58) Field of Search ........................... 73/204.21, 493, 73/204.27, 204.26

(56) References Cited

U.S. PATENT DOCUMENTS

| 4,542,650 A | * | 9/1985 | Renken et al. ............... 73/196 |
| 5,595,163 A | * | 1/1997 | Nogi et al. .................. 123/494 |
| 5,914,019 A | * | 6/1999 | Dodgson et al. ............ 204/415 |
| 6,035,712 A | * | 3/2000 | Ohta et al. .................... 73/493 |

FOREIGN PATENT DOCUMENTS

JP            A 10-2773         1/1998

* cited by examiner

*Primary Examiner*—Edward Lefkowitz
*Assistant Examiner*—Jewel V. Thompson
(74) *Attorney, Agent, or Firm*—Oliff & Berridge, PLC

(57) ABSTRACT

A board mounting thereon a measuring chip is fixed to a body in close contact relation to form a main passage and a sensor passage inside of the body, while a hot wire for a temp. sensor and a hot wire for a flow velocity sensor, both being provided on the measuring chip, are bridged across the sensor passage, to measure the flow rate of a gas flowing in the inside of the body by means of an electric circuit on the back side of the board. In a state where an electrode for a hot wire on the measuring chip is joined to an electrode for the electric circuit on the board, the temp. sensor hot wire and the flow velocity sensor hot wire both provided on the measuring chip are connected to the electric circuit on the back side of the board.

40 Claims, 12 Drawing Sheets

| THICKNESS OF BOTTOM PLATE (mm) | SECTIONAL AREA OF MAIN PASSAGE (mm²) | SECTIONAL AREA OF SENSOR PASSAGE (mm²) |
|---|---|---|
| 2 | 28 | 0.7 |
| 3 | 31 | |
| 3.5 | 18.9 | |
| 4.5 | 10.5 | |

…

THERMAL FLOW SENSOR

BACKGROUND OF THE INVENTION

1. Field of the Invention

The present invention relates to a thermal flow sensor for measuring a flow rate by means of hot wires.

2. Description of Related Art

Some conventional thermal flow sensors for measuring a flow rate by using hot wires are provided with a measuring chip manufactured by a semiconductor micro-machining technology as a sensor part as shown in FIG. 18. In a thermal flow sensor 101 in FIG. 18, a gas to be measured is caused to flow in an inlet port 102, is made into a laminar flow by a laminar flow mechanism 103, and is caused to pass through a measuring passage 104 and flow out through an outlet port 105. For measurements of the flow rate of the gas, a measuring chip 111 connected to an electric circuit 106 is arranged in an exposed state in the measuring passage 104.

In this regard, the measuring chip 111 is constructed, as shown in FIG. 19, of a silicon chip 116 on which an upstream thermo-sensor 112, a heater 113, a downstream thermo-sensor 114, and an ambient temperature sensor 115 (these sensors 112 through 115 correspond to "hot wires") and others are formed by a semiconductor micro-machining technology.

Accordingly, in the thermal flow sensor 101 in FIG. 18, while the gas does not flow through the measuring passage 104, the distribution of temperatures of the measuring chip 111 in FIG. 19 is symmetrical with respect to the heater 113. While the gas flows through the measuring passage 104, on the other hand, the temperature of the upstream thermo-sensor 112 is decreased and the temperature of the downstream thermo-sensor 114 is increased. Accordingly, the distribution of temperatures of the measuring chip 111 becomes unsymmetrical according to the flow rate of the gas to be measured. At this time, the degree of such unsymmetry is outputted as a difference in resistance values between the upstream thermo-sensor 112 and the downstream thermo-sensor 114. Thus, the flow rate of the gas can be measured by the electric circuit 106.

In the thermal flow sensor 101 in FIG. 18, however, six electrodes D1, D2, D3, D4, D5, and D6 are provided on the silicon chip 116 of the measuring chip 111 in FIG. 19 so that the upstream thermo-sensor 112, the heater 113, the downstream thermo-sensor 114, and the ambient temp. sensor 115 are individually connected to the electric circuit 106 by wire bonding using those six electrodes D1–D6.

In the thermal flow sensor 101 in FIG. 18 as above, the measuring chip 111 is exposed in the inside of the measuring passage 104 where a bonding wire W is provided. When a high flow rate of a gas to be measured is caused to flow in the measuring passage 104, accordingly, the bonding wire W can possibly be cut due to the pressure of the flowing gas. To prevent it, addition of a covering mechanism (for example, "a support body 13a" in Japanese patent unexamined publication No. Hei 10-2773) or other measures must be taken.

SUMMARY OF THE INVENTION

The present invention has been made in view of the above circumstances and has an object to overcome the above problems and to provide a thermal flow sensor which uses a measuring chip as a sensor part, the measuring chip being provided with hot wires, and which can eliminate the use of wire bonding for connection between the hot wires of the measuring chip and an electric circuit.

The thermal flow sensor according to the present invention made to achieve the above purpose is characterized by including: a measuring chip provided with a hot wire and an electrode for the hot wire, the electrode being connected to the hot wire; a board having a front side on which an electrode for an electric circuit is provided, the electrode being connected to the electric circuit for performing a measuring principle using the hot wire; a body to which the measuring chip is attached in close contact relation to form a main passage; wherein at least one of the measuring chip and the board is formed with a groove, and a sensor passage in relation to the main passage is formed by the groove between the measuring chip and the board in a state where the measuring chip is mounted on the board with the hot wire electrode being joined to the electric circuit electrode, and the hot wire is laid across the sensor passage.

The thermal flow sensor according to another aspect of the invention is characterized a thermal flow sensor including: a measuring chip provided with a hot wire and an electrode for the hot wire, the electrode being connected to the hot wire; an electric circuit electrode pin connected to an electric circuit for performing a measuring principle using the hot wire; a board in which the electrode pin is inserted; an elastic body which provides a seal between the electric circuit electrode pin and the board; and a body in which the board is attached in close contact relation to form a main passage; wherein a sensor passage in relation to the main passage is formed in a long slot shape by a thickness of the elastic body between the measuring chip and the board in a state where the measuring chip is mounted on a front side of the board with the hot wire electrode being joined to a flat head of the electric circuit electrode pin, and the hot wire is laid across the sensor passage.

DETAILED DESCRIPTION OF THE PREFERRED EMBODIMENTS

Figure 1:
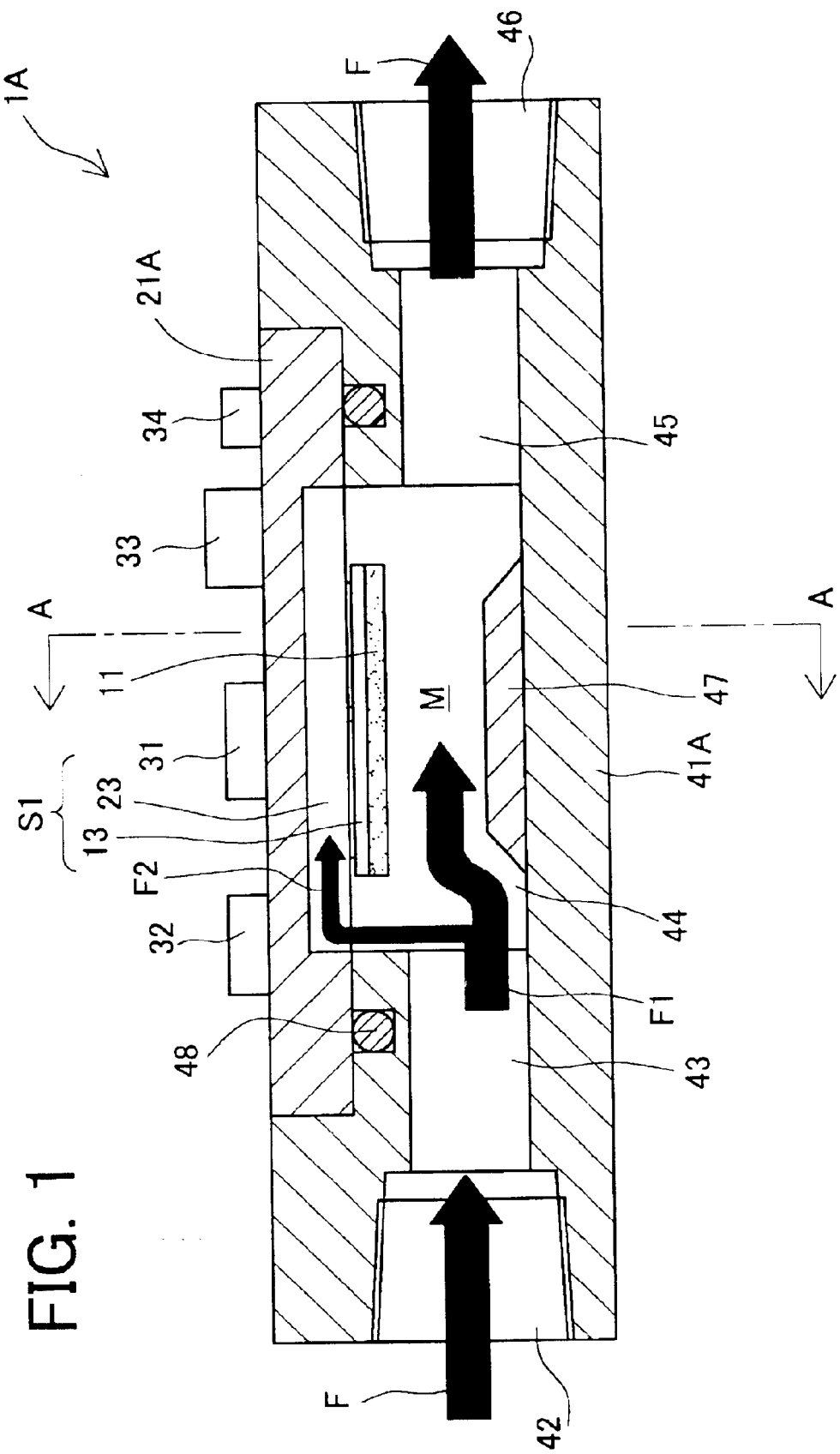
FIG. 1 is a cross sectional view of a thermal flow sensor of the invention.

A detailed description of preferred embodiments of the present invention will now be given referring to the accompanying drawings. As shown in FIG. 1, in a thermal flow sensor 1A in the present embodiment, a board 21A is fixed to a body 41A in close contact relation through an O-ring 48 by screws. The body 41A is formed with an inlet port 42, an inlet passage 43, a measuring passage 44, an outlet passage 45, and an outlet port 46. In the measuring passage 44, a bottom plate 47 is secured by screws.

Figure 4:
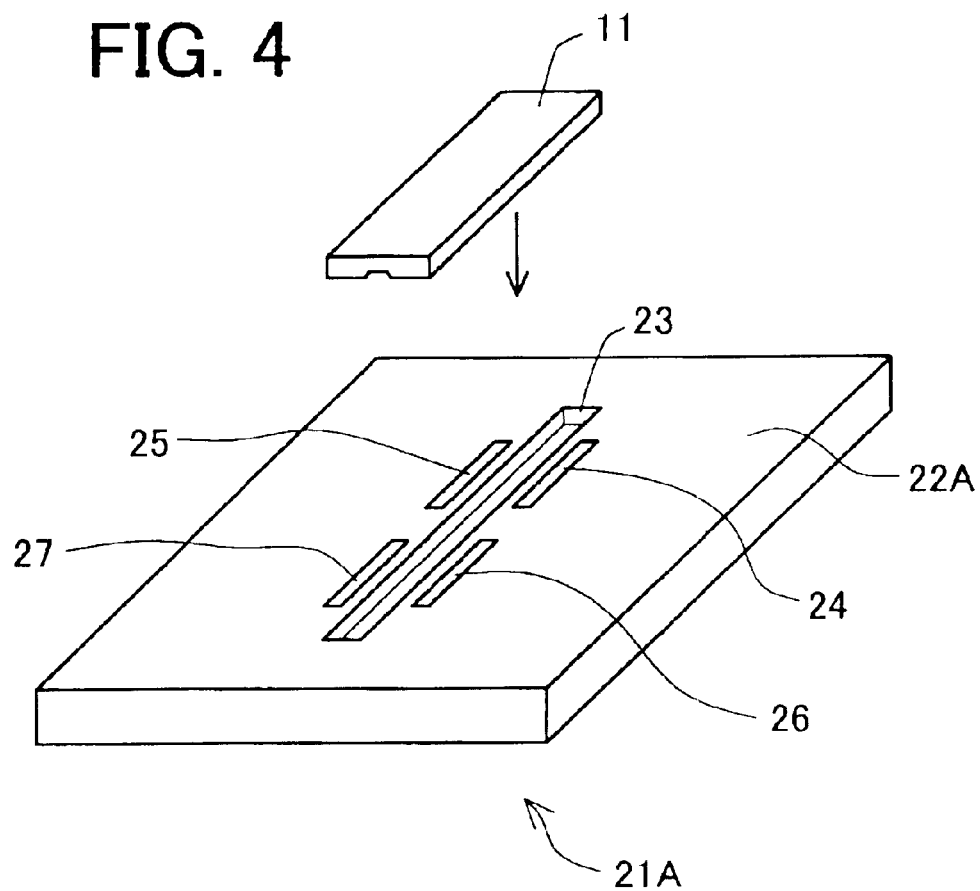
FIG. 4 is a perspective view showing a step of mounting the measuring chip onto a board in the thermal flow sensor of the invention.

On the other hand, the board 21A is provided with an electric circuit constructed of electric elements 31, 32, 33, 34 and others on the back side of a printed circuit board 22A (see FIG. 4). As shown in FIG. 4, furthermore, on the front side of the printed circuit board 22A, a groove 23 is formed and electrodes 24, 25, 26, and 27 for the electric circuit are formed on both sides of the groove 23. These electrodes 24–27 are connected, inside the printed circuit board 22A, to the electric circuit constructed of the electric elements 31–34 (see FIG. 1). Additionally, a measuring chip 11 is mounted on the front side of the printed circuit board 22A in a manner mentioned later.

The measuring chip 11 is explained below. As shown in a front view of FIG. 2 and a side view of FIG. 3, the measuring chip 11 is made of a silicon chip 12 which has been processed by a semiconductor micro-machining technology. At this time, a groove 13 is formed and electrodes 14, 15, 16, and 17 for hot wires are formed on both sides of the groove 13. At this time, a hot wire 18 for a temperature sensor is also formed extending from the electrodes 14 and 15 so as to be laid across the groove 13, and a hot wire 19 for a flow velocity sensor is formed extending from the electrodes 16 and 17 so as to be laid across the groove 13.

The hot wire electrodes 14, 15, 16, and 17 on the measuring chip 11 are joined to the electric circuit electrodes 24, 25, 26, and 27 on the board 21A (see FIG. 4) respectively by reflow soldering, adhesives, or others. Thus, the measuring chip 11 is mounted on the board 21A. When the mounting chip 11 is mounted on the board 21A, consequently, the temp. sensor hot wire 18 and the flow velocity sensor hot wire 19 both formed on the measuring chip 11 are connected to the electric circuit provided on the back side of the board 21A through the hot wire electrodes 14–17 on the measuring chip 11 and the electric circuit electrodes 24–27 on the board 21A (see FIG. 4).

Figure 5:
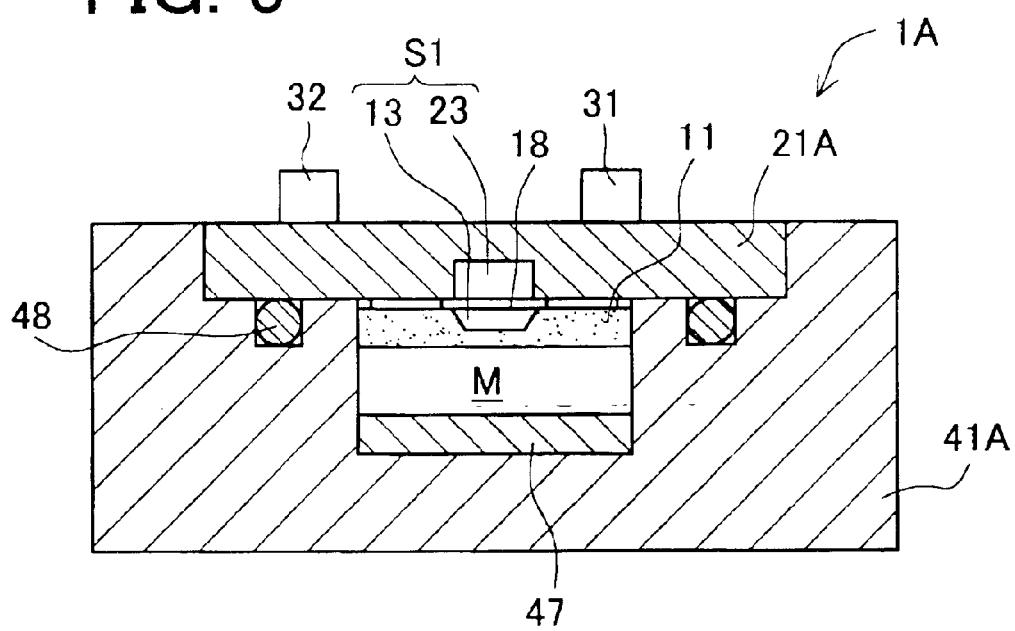
FIG. 5 is a sectional view taken along a line A—A in FIG. 1.

When the measuring chip 11 is mounted on the board 21A, as shown in, FIG. 5, the groove 13 of the measuring chip 11 is arranged to coincide with the groove 23 of the board 21A. Accordingly, as shown in FIGS. 1 and 5, when the board 21A mounting thereon the measuring chip 11 is fixed to the body 41A in close contact relation, in the measuring passage 44 of the body 41A, a main passage M is produced between the measuring chip 11 and the bottom plate 47 and, on the other hand, a sensor passage S1 is formed between the board 21A and the measuring chip 11. This sensor passage S1 is constructed of the groove 13 of the measuring chip 11 and the groove 23 of the board 21A. Accordingly, in the sensor passage S1, the temp. sensor hot wire 18 and the flow velocity sensor hot wire 19 are laid like a bridge.

Consequently, in the thermal flow sensor 1A in the present embodiment, as shown in FIG. 1, when a gas to be measured is caused to flow in the body 41A through the inlet port 42 (F in FIG. 1), the gas is divided in the measuring passage 44 of the body 41 into the flow of a gas flowing in the main passage M (F1 in FIG. 1) and the flow of a gas flowing in the sensor passage S1 (F2 in FIG. 1). After that, the divided flows of the gas are joined again into one flow to be caused to flow out of the body 41A through the outlet port 46 (F in FIG. 1).

In this regard, the gas flowing in the sensor passage S1 (F2 in FIG. 1) removes heat from the hot wires 18 and 19 bridged across the sensor passage S1. The electric circuit provided on the back side of the board 21A detects the output from the hot wires 18, 19 and others to control so that a temperature difference between the hot wires 18 and 19 becomes constant.

Figure 6:
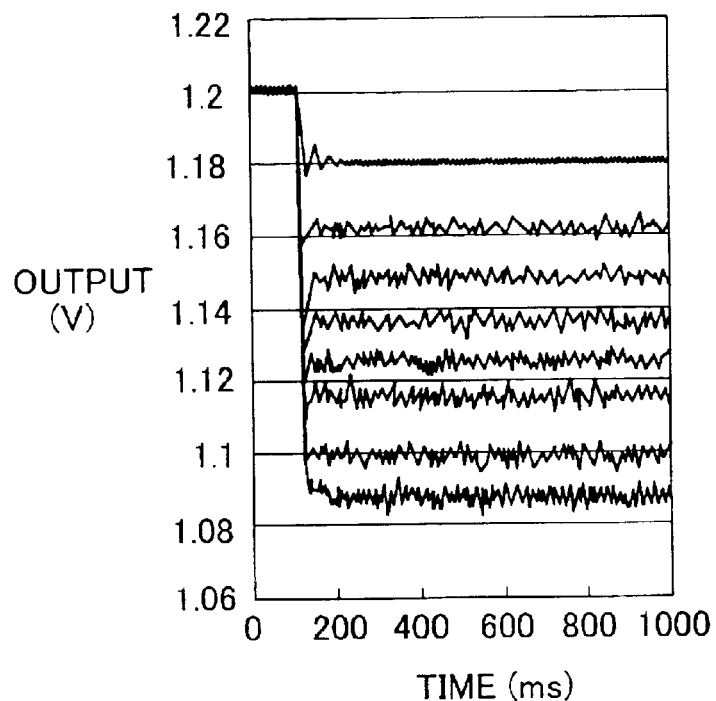
FIG. 6 is a graph showing output characteristics of the thermal flow sensor of the invention.

An example of the output at this time is shown in FIG. 6. A graph in FIG. 6 shows the output corresponding to the flow rate of the gas flowing through the inlet port 42 into the body 41A (F in FIG. 1) in the thermal flow sensor 1A in the present embodiment, the flow rate being plotted in the following order from top, 2 (1/min), 4 (1/min), 6 (1/min), 8 (1/min), 10 (1/min), 12 (1/min), 16 (1/min), and 20 (1/min). A graph in FIG. 7 shows the output corresponding to the flow rate of the gas in one example of the conventional thermal flow sensor, the flow rate being plotted in the following order from top, 2 (1/min), 4 (1/min), 6 (1/min), 8 (1/min), 10 (1/min), 12 (1/min), 16 (1/min), and 20 (1/min).

Figure 7:
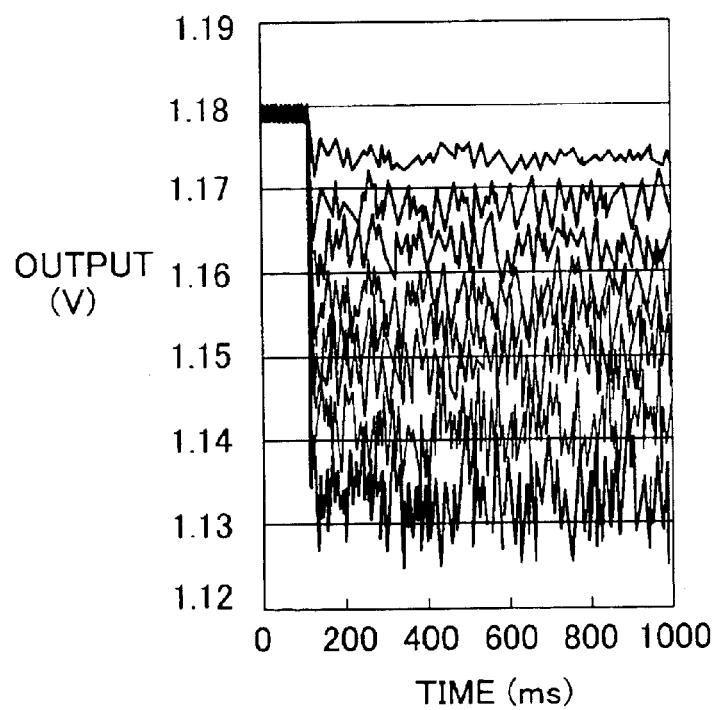
FIG. 7 is a graph showing output characteristics of a conventional thermal flow sensor.
Figure 9:
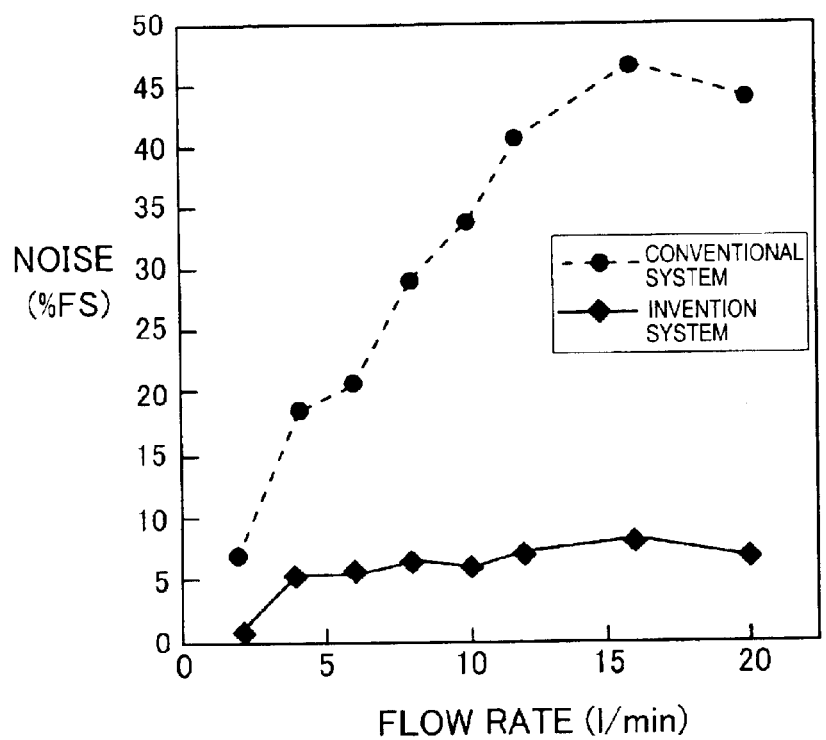
FIG. 9 is a graph showing a comparison of turbulent flow noise in the output characteristics of the thermal flow sensor of the invention to those of the conventional thermal flow sensor.

It is apparent from a comparison between FIG. 6 and FIG. 7 that the output in the thermal flow sensor 1A in the present embodiment is of smaller amplitude as compared with that in the example of the conventional thermal flow sensor. FIG. 9 is a graph showing noise representing the ratios of the amplitudes with respect to the output values. It is also clear from FIG. 9 that the noise in the thermal flow sensor 1A in the present embodiment is lower than that in the example of the conventional thermal flow sensor.

It is to be noted that in FIG. 9 "Invention system" means the thermal flow sensor 1A in the present embodiment and "Conventional system" means the example of the conventional thermal flow sensor. In this regard, the same applies to FIG. 8 mentioned later.

Figure 8:
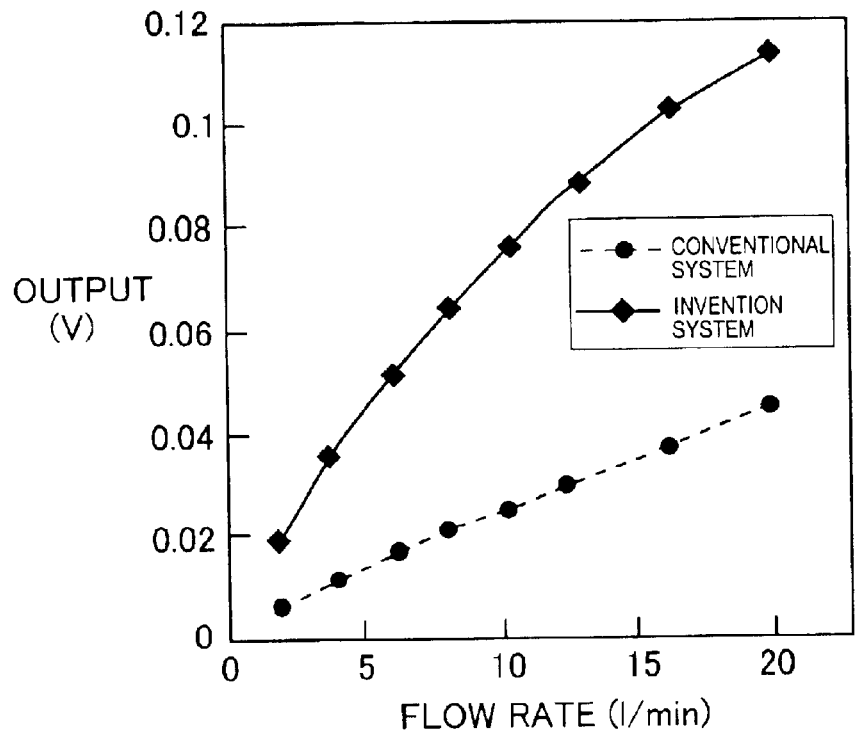
FIG. 8 is a graph showing a comparison of the output characteristics of the thermal flow sensor of the invention to those of the conventional thermal flow sensor.

FIG. 8 is a graph showing the average of the output in FIG. 6 as the "Invention system". More specifically, the averaged value of the output changes depending on the flow rate of the gas flowing through the inlet port 42 into the body 41A (F in FIG. 1), and the repeatability thereof is compensated by a temperature compensating circuit (a part of the electric circuit on the board 21A). Thus, the thermal flow sensor 1A in the present embodiment can measure the flow rate of the gas flowing through the inlet port 42 into the body 41A (F in FIG. 1).

Figures 10, 11:
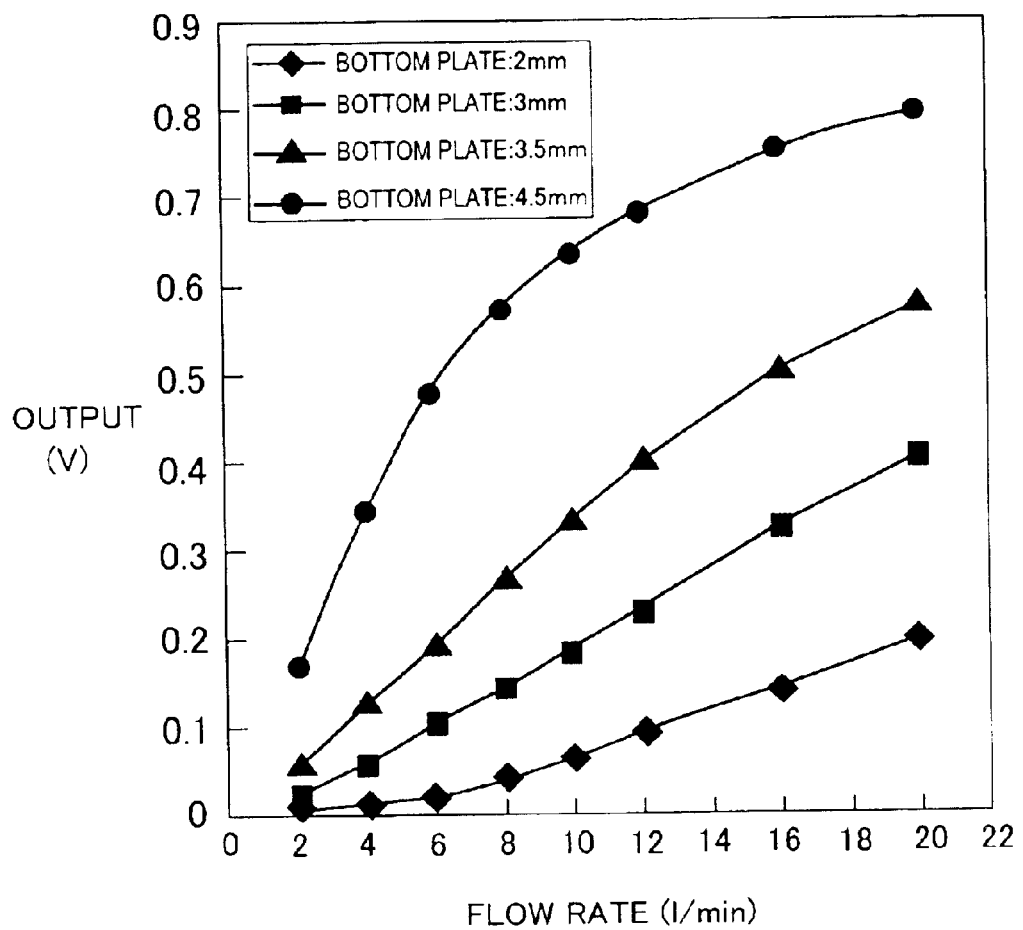
FIG. 10 is a graph showing output characteristics of the thermal flow sensor of the invention according to the change in the height of a bottom plate.
FIG. 11 is a table showing an example of a relation between the height of the bottom plate and the cross sectional area of a main passage in the thermal flow sensor of the invention.

FIG. 10 is a graph showing output characteristics of the thermal flow sensor 1A in the present embodiment according to the change in the height of the bottom plate 47 (see FIGS. 1 and 5). As shown in FIG. 10, the output characteristics vary according to the change in the height of the bottom plate 47 (see FIGS. 1 and 5) to 2 mm, 3 mm, 3.5 mm, and 4.5 mm. The reason thereof is considered as follows. When the height of the bottom plate 47 (see FIGS. 1 and 5) is changed as shown in FIG. 11, the sectional area of the sensor passage S1 (see FIGS. 1 and 5) remains unchanged, whereas the sectional area of the main passage M (see FIGS. 1 and 5) is changed. This causes changes in the flow rate of the gas (F1 in FIG. 1) flowing in the main passage M and the flow rate of the gas (F2 in FIG. 1) flowing in the sensor passage S1.

Considering that the range in which the output characteristics have linearity corresponds to the range suitable for measurements, it is apparent from FIG. 10 that when the height of the bottom plate 47 (see FIGS. 1 and 5) is 3 mm, the flow rate of the gas can be measured in the range of 0–20 (1/min) and, when the height of the bottom plate 47 (see FIGS. 1 and 5) is 4.5 mm, the flow rate of the gas can be measured in the range of 0–4 (1/mm). Thus, if only the bottom plate 47 fixedly provided in the body 41A by screws is replaced, the body 41A can be made suitable for the measurement range of the flow rate (flow rate range) of the gas.

As explained above, in the thermal flow sensor 1A in the present embodiment, as shown in FIGS. 1 through 5, when the measuring chip 11 is mounted on the board 21A, the hot wire electrodes 14–17 provided on the measuring chip 11 are joined to the electric circuit electrodes 24–27, provided on the front side of the board 21A. Accordingly, the temp. sensor hot wire 18 and the flow velocity sensor hot wire 19 both provided on the measuring chip 11 are connected to the electric circuit (constructed of the electric components 31–34 provided on the back side of the board 21A) for performing a measurement principle using the hot wires 18 and 19.

When the board 21A is fixed to the body 41A in close contact relation by screws, on the other hand, the main passage M is formed in the measuring passage 44 of the body 4A. At this time, the board 21A has the groove 23 and the measuring chip 11 mounted on the board 21A has the groove 13, so that the sensor passage S1 in relation to the main passage M is also formed in the measuring passage 44 in the body.

Accordingly, the gas flowing through the measuring passage 44 of the body 41A is divided into the main passage M and the sensor passage S1 according to a sectional area ratio between the main passage M and the sensor passage S1. In this respect, since the hot wires 18 and 19 provided on the measuring chip 11 are bridged across the sensor passage S1, the electric circuit (constructed of the electric components 31–34 and others on the back side of the board 21A) for performing a measurement principle using the hot wires 18 and 19 can measure (the flow rate of the gas flowing through the sensor passage S1 and by extension) the flow rate of the gas flowing through the inside of the body 41A (see FIGS: 6, 8, 10, and 11).

More specifically, the thermal flow sensor 1A in the present embodiment is constructed, as shown in FIGS. 1 through 5, so that the board 21A mounting thereon the measuring chip 11 is fixed to the body 41A in close contact relation by screws, thereby producing the main passage M and the sensor passage S1 in the measuring passage 44 of the body 41A, and simultaneously the hot wires 18 and 19 provided on the measuring chip 11 are in a bridged state across the sensor passage S1 to measure (the flow rate of the gas flowing through the sensor passage S1 and by extension) the flow rate of the gas flowing through the inside of the body 41A through the electric circuit (constructed of the electric components 31–34 and others provided on the back side of the board 21A) (see FIGS. 6, 8, 10, and 11). Thus, the measuring chip 11 provided with the hot wires 18 and 19 is used as the sensor part. The hot wires 18 and 19 provided on the measuring chip 11 are connected to the electric circuit (constructed of the electric components 31–34 and others provided on the back side of the board 21A) when the hot wire electrodes 14–17 on the measuring chip 11 are joined to the electric circuit electrodes 24–27 on the board 21A by reflow soldering and the like after the measuring chip 11 is mounted on the board 21A. Consequently, it can be said that the use of the wire bonding is eliminated for connection between the hot wires 18 and 19 on the measuring chip 11 to the electric circuit (constructed of the electric components 31–34 and others provided on the back side of the board 21A).

In the thermal flow sensor 1A in the present embodiment, as shown in FIGS. 1 through 5, the hot wires 18 and 19 provided on the measuring chip 11 in a bridged state across the sensor passage S1 are apt to be broken. However, the sensor passage S1, which is the groove 23 formed in the board 21A and the groove 13 formed in the measuring chip 11 mounted on the board 21A, is therefore formed between the measuring chip 11 and the board 21A. When the measuring chip 11 is mounted on the board 21A, the hot wires 18 and 19 provided on the measuring chip 11 are sandwiched between the measuring chip 11 and the board 21A and prevented from being touched from outside. This makes it easy to the handling of the hot wires 18 and 19 during an assembly process, a test process, and others.

In the thermal flow sensor 1A in the present embodiment, even when the hot wires 18 and 19 provided on the measuring chip 11 are broken, it can be recovered by replacement of the whole board 21A mounting thereon the measuring chip 11 (in this embodiment, replacement by taking out the screws), which facilitates repair thereof.

The thermal flow sensor 1A in the present embodiment measures (the flow rate of the gas flowing through the sensor passage S1 and by extension) the flow rate of the gas flowing through the inside of the body 41 through the electric circuit (constructed of the electric components 31–34 and others on the back side of the board 21A) while the hot wires 18 and 19 provided on the measuring chip 11 are in a bridged state across the sensor passage S1. In this respect, since the sensor passage S1 is formed of the groove 23 in the board 21A and the groove 13 in the measuring chip 11 mounted on the board 21A, the flow of the gas is made laminar through the grooves 13 and 23 each having a long slot shape. Accordingly, the noise resulting from a turbulent flow in measurement results can be reduced (see FIGS. 6–8).

In the thermal flow sensor 1A in the present embodiment, the electric circuit for performing a measurement principle using the hot wires 18 and 19 is provided on the back side of the board 21A. In addition, the measuring chip 11 provided with the hot wires 18 and 19 is mounted on the front side of the board 21A. Accordingly, the measuring chip 11 provided with the hot wires 18 and 19 and the electric circuit for performing the measurement principle using the hot wires 18 and 19 are integrated on a single board 21A, which contributes to space saving and cost reduction.

Figure 2:
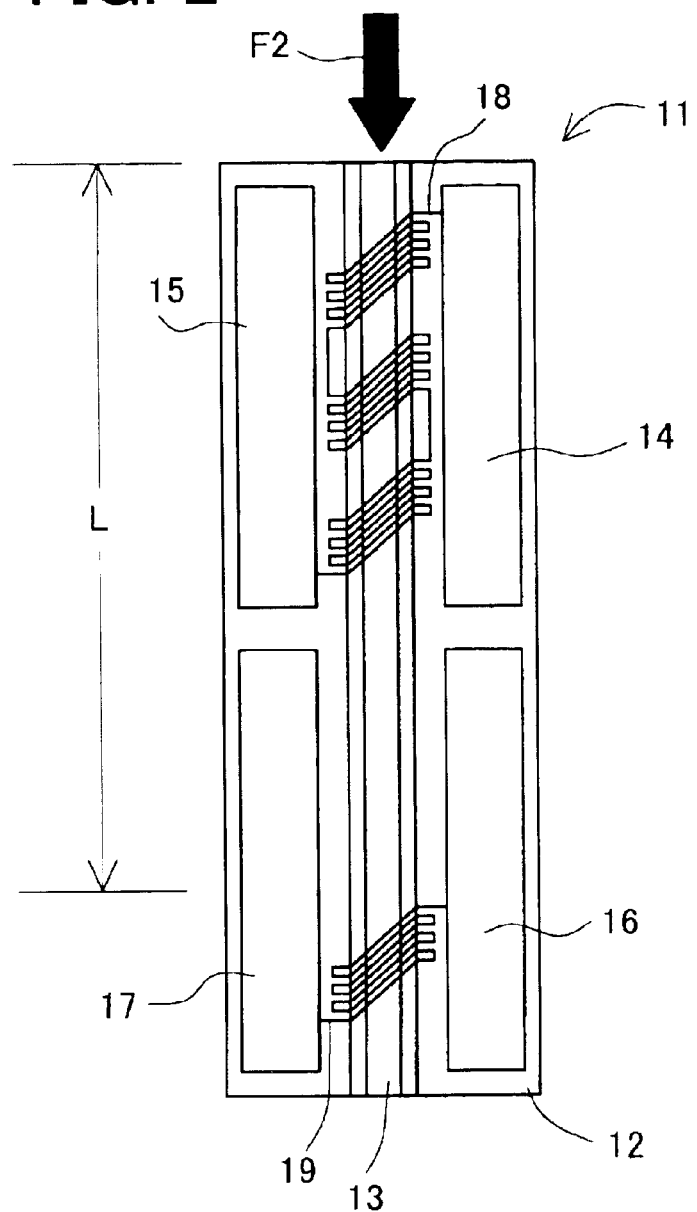
FIG. 2 is a front view of a measuring chip used in the thermal flow sensor of the invention.
Figure 3:
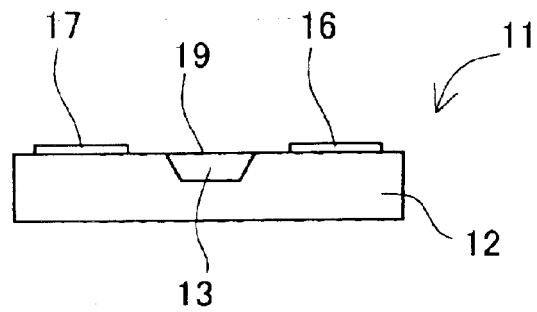
FIG. 3 is a side view of the measuring chip used in the thermal flow sensor of the invention.

In the thermal flow sensor 1A in the present embodiment, as shown in FIG. 2, the hot wire 19 for the flow velocity sensor is laid in a downstream part of the sensor passage S1 to provide a long approach interval L for the gas F2 flowing through the sensor passage S1. In this regard, in the downstream part of the sensor passage S1, the effect of making the flow of the gas F2 flowing through the sensor passage S1 into a laminar flow is largely exercised owing to the long slot shape of the sensor passage S1. Accordingly, the turbulent flow noise in the measurement results can be further reduced (see FIG. 9).

In the thermal flow sensor 1A in the present embodiment, as shown in FIGS. 1 and 5, the bottom plate 47 is secured inside the body 41 by screws. The gas flowing through the measuring passage 44 is divided into the main passage M (F1 in FIG. 1) and the sensor passage S1 (F2 in FIG. 1) according to the sectional area ratio between the main passage M and the sensor passage S1. Hence, if only the sectional area of the main passage M is changed by replacement of bottom plates 47 having different heights (see FIG. 11), the output characteristics from the hot wire 19 laid across the sensor passage S1 and others can be changed as shown in FIG. 10. According to the output characteristics in FIG. 10, the measurement range of the flow rate (flow rate range) of (the gas flowing through the sensor passage S1 and by extension) the gas flowing through the inside of the body 41 can be adjusted.

The present invention may be embodied in other specific forms without departing from the spirit or essential characteristics thereof.

For instance, in the thermal flow sensor 1A in the above embodiment, the board 21A is formed with the groove 23 and the measuring chip 11 is formed with the groove 13 as shown in FIGS. 1 and 5. As an alternative, the board 21A may not be formed with the groove 23 if only the measuring chip 11 is formed with the groove 13. This is because the sensor passage S1 can be formed in the measuring passage 44 of the body 41 even where only the measuring chip 11 is formed with the groove 13. In this case, it can eliminate the need for forming the groove 23 in the board 21A. This point is specifically effective in the board 21A if made of ceramic, metal, or other materials in which a groove can not easily be processed.

Alternatively, the measuring chip 11 may not be formed with the groove 13 if only the board 21 A is formed with the groove 23. This is because the sensor passage S1 can be formed in the measuring passage 44 of the body 41A even where only the board 21A is formed with the groove 23. In this case, it can eliminate the need for forming the groove 13 in the measuring chip 11 and furthermore prevent a reduction in strength of the measuring chip (silicon chip) 11 which would be caused by a grooving process.

In the thermal flow sensor 1A in the above embodiment, as shown in FIGS. 1 through 5, the hot wire electrodes 14, 15, 16, and 17 on the measuring chip 11 are joined to the electric circuit electrodes 24, 25, 26 and 27 on the board 21A by reflow soldering, conducting adhesives, or others to mount the measuring chip 11 on the board 21A. However, the measuring chip 11 may be mounted on a board 21B as shown in sectional views of FIGS. 12 and 13.

Figure 12:
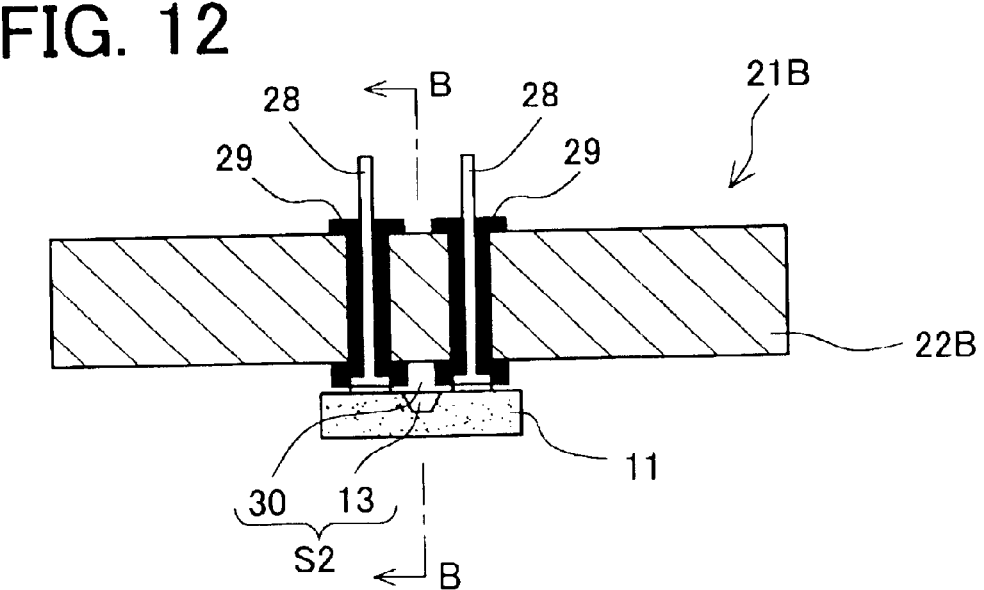
FIG. 12 is a sectional view of another example of the board mounting thereon measuring elements in the thermal flow sensor of the invention.
Figure 13:
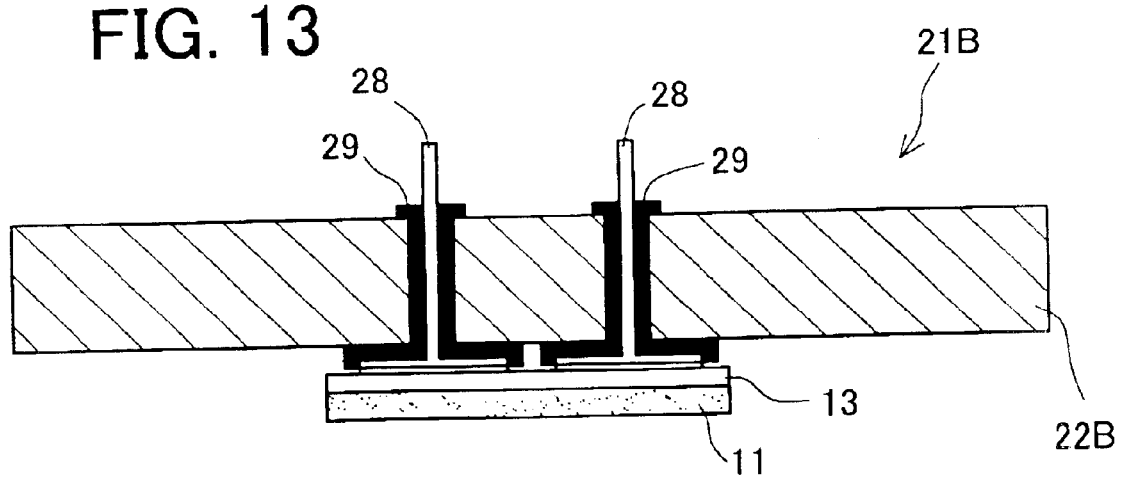
FIG. 13 is a sectional view taken along a line B—B in FIG. 12.

More specifically, the board 21B in FIGS. 12 and 13 is constructed so that four electrode pins 29 for electric circuit are inserted in a printed circuit board 22B through rubbers 29 which are elastic bodies. The flat heads of the electric circuit electrode pins 29 are used in place of the electric circuit electrodes 24–27 on the board 21A mentioned above. At this time, in the measuring passage 44 in the body 41 in FIG. 1, a sensor passage S2 defined by the thickness of the rubbers 29 and the groove 13 of the measuring chip 11 is formed in place of the sensor passage S1 mentioned above.

In the thermal flow sensor in which the board 21B mounting thereon the measuring chip 11 (shown in FIGS. 12 and 13) is fixed to the body 41A in close contact relation by screws, the sensor passage S2 is defined by the thickness of the rubbers 29 existing between the board 21B and the measuring chip 11 mounted on the board 21B and the groove 13 of the measuring chip 11 as shown in FIGS. 12 and 13, so that the board 21B does not have to be formed with a groove. This point is specifically effective in the board 21B if made of ceramic, metal, or other materials in which a groove can not easily be processed.

In the thermal flow sensor in which the board 21B mounting thereon the measuring chip 11 (shown in FIGS. 12 and 13) is fixed to the body 41A in close contact relation by screws, the rubbers 29 exist between the board 21B and the measuring chip 11 mounted on the board 21B as shown in FIGS. 12 and 13. Accordingly, the rubbers 29 serve as a cushioning material, which can prevent the measuring chip (silicon chip) 11 mounted on the board 21B from being broken even if the board 21B slightly warps.

It is to be noted that the sensor passage S2 in FIGS. 12 and 13 is defined by the thickness of the rubbers 29 existing between the board 21B and the measuring chip 11 mounted on the board 21B and the groove 13 of the measuring chip 11, but it may be defined by only the thickness of the rubbers 29. Furthermore, the board 21B may be formed with a groove to be used as a part of the sensor passage S2. In this case, the need for forming the groove 13 in the measuring chip 11 can be eliminated, thus preventing a reduction in strength of the measuring chip (silicon chip) 11 which would be caused by a grooving process.

Figure 14:
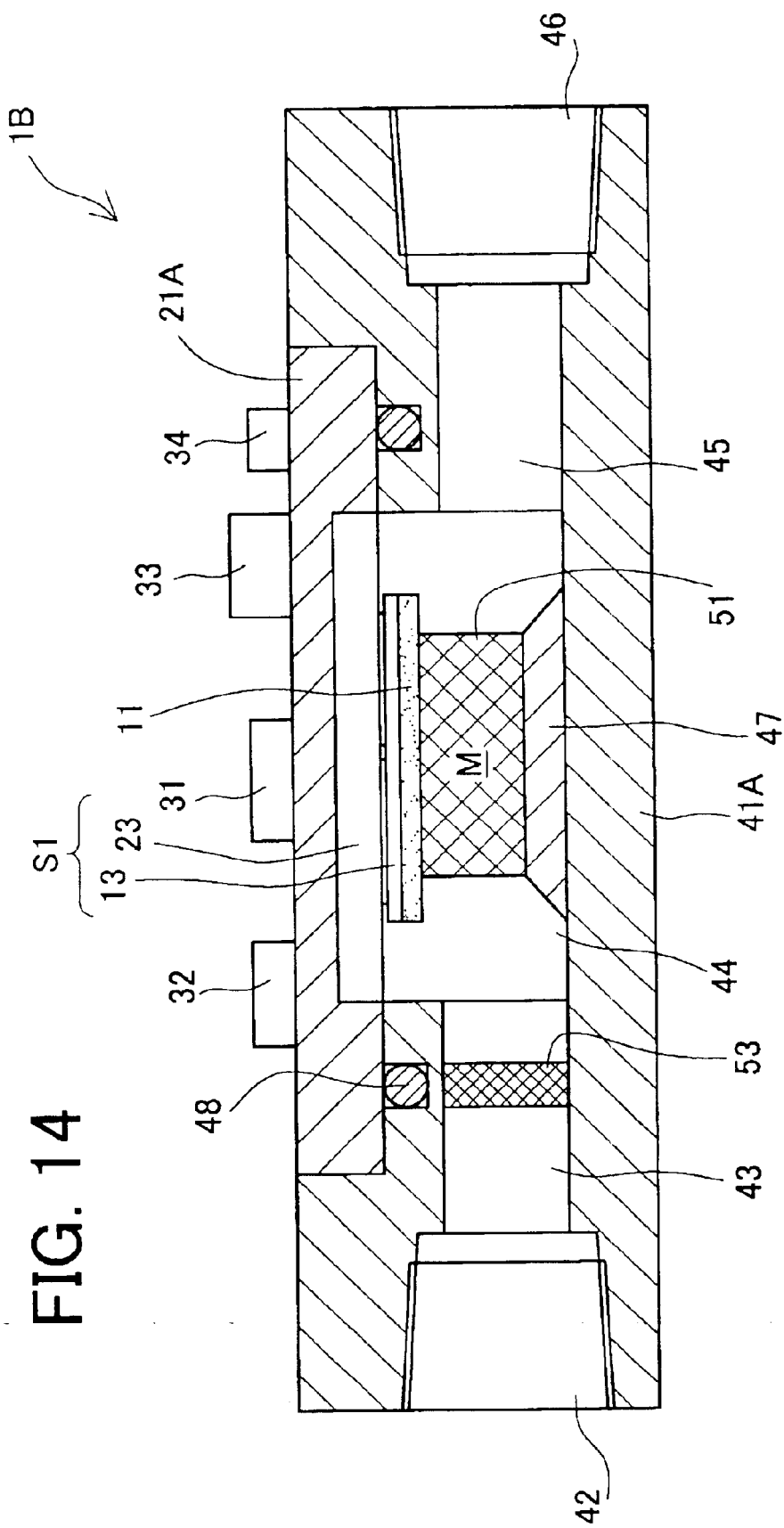
FIG. 14 is a sectional view of another example of the thermal flow sensor of the invention.
Figure 15:
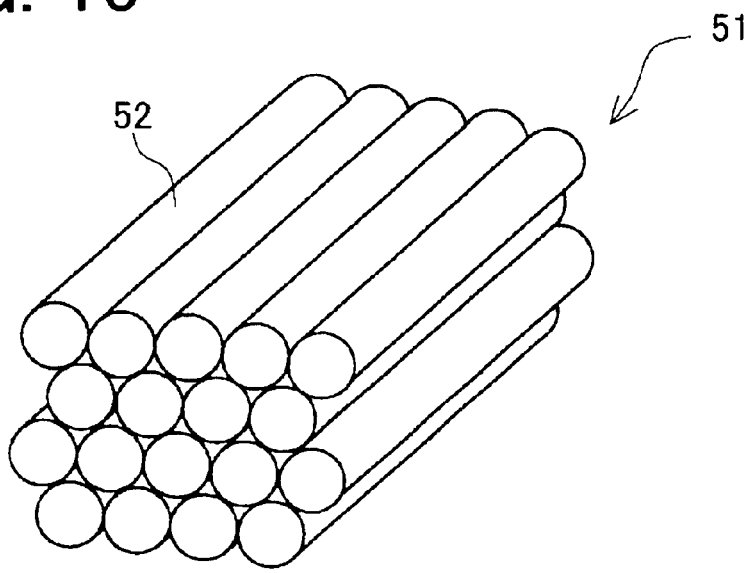
FIG. 15 is a perspective view of a laminar flow mechanism.
Figure 16:
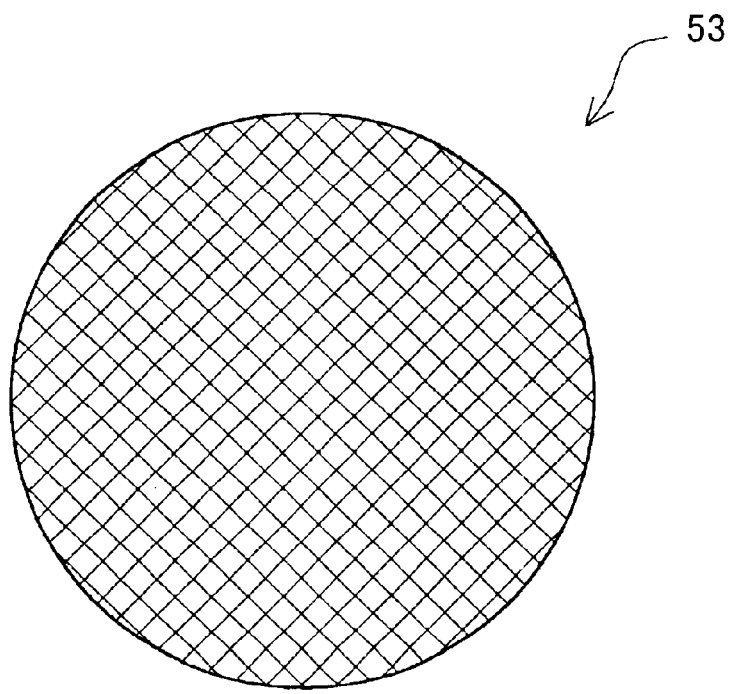
FIG. 16 is a front view of a laminar flow plate.

In a thermal flow sensor 1B shown in FIG. 14, different from the above mentioned thermal flow sensor LA, a laminar flow plate (wire netting) 53 in FIG. 16 is placed in the inlet passage 43 of the body 41A and a laminar flow mechanism 51 constructed of stainless pipes 52 in FIG. 15 is provided in the main passage M of the measuring passage 44 of the body 41. This makes it possible to further reduce the amplitude of output in FIG. 6 and lower noise values in FIG. 9.

Figure 17:
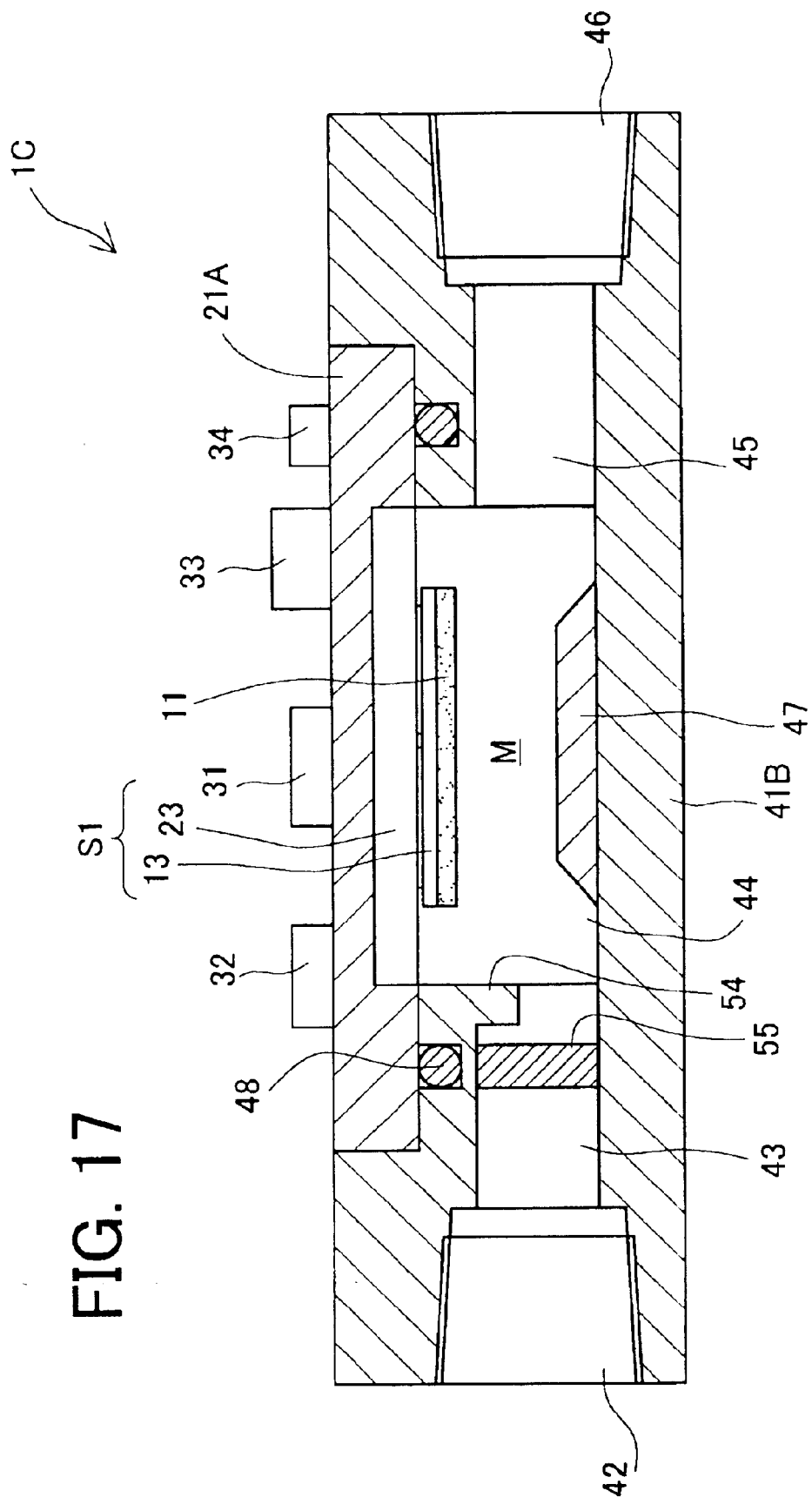
FIG. 17 is a sectional view of another example of the thermal flow sensor of the invention.
Figure 18:
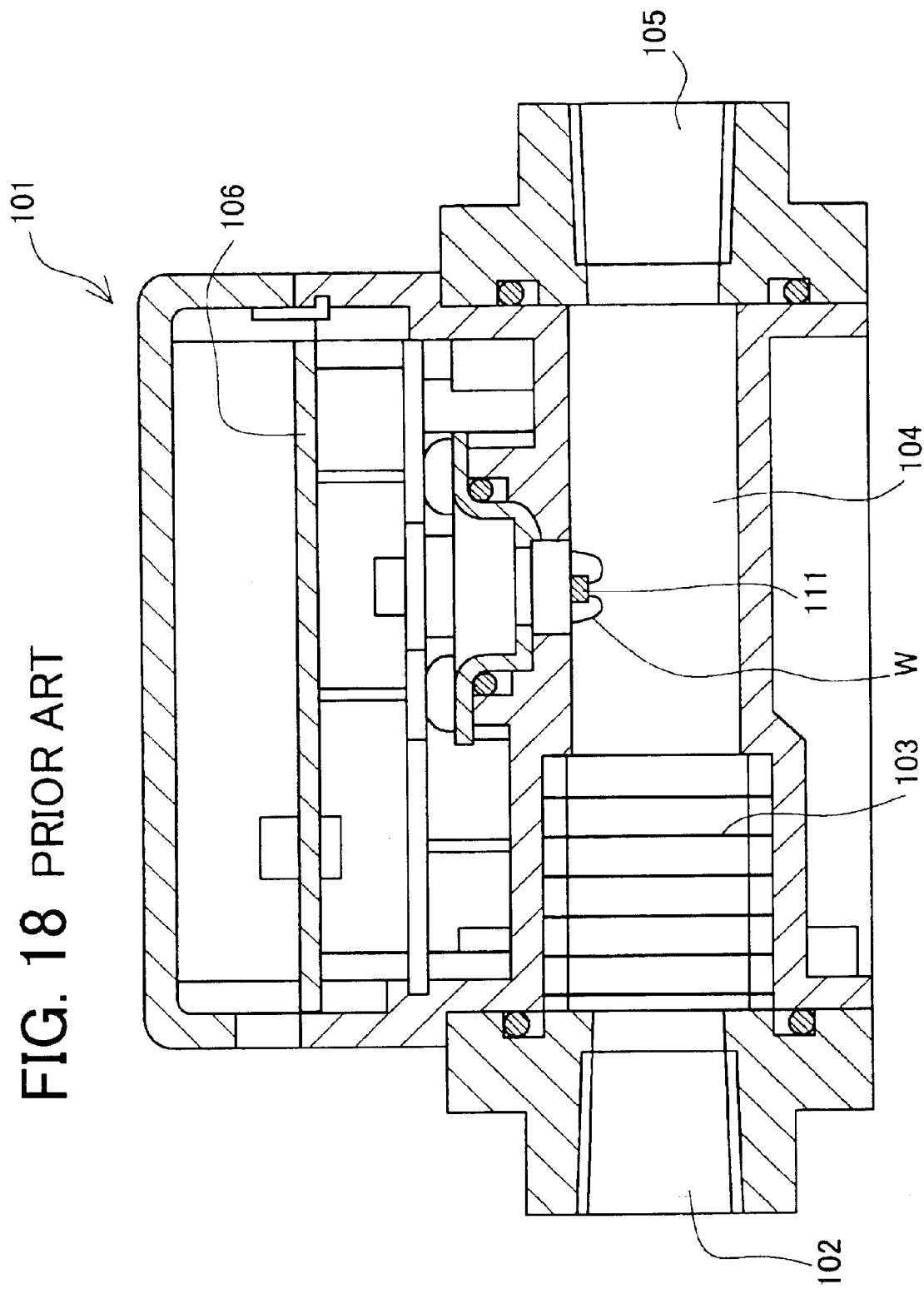
FIG. 18 is a sectional view of the conventional thermal flow sensor.
Figure 19:
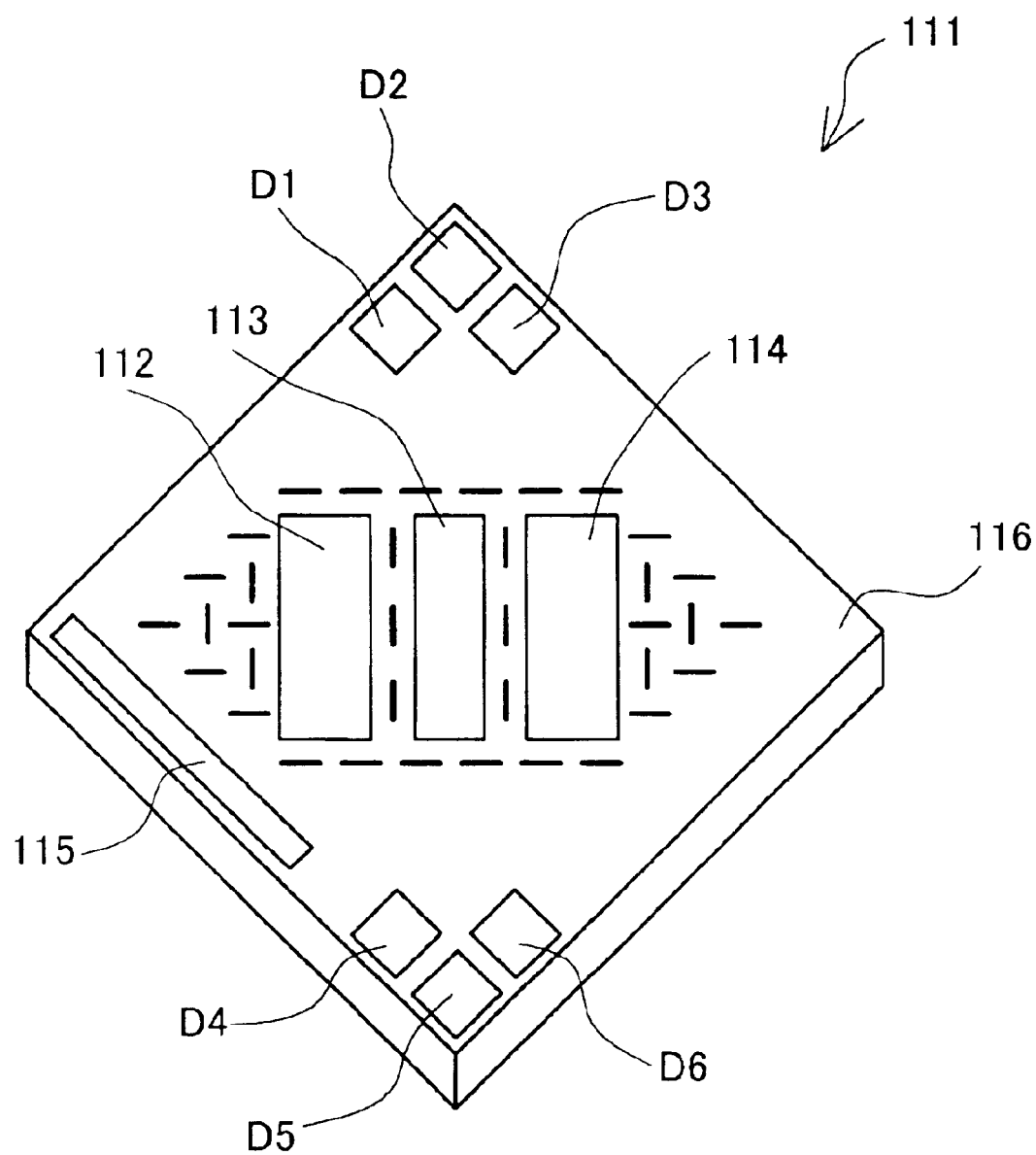
FIG. 19 is a perspective view of measuring elements used in the conventional thermal flow sensor.

In a thermal flow sensor 1C shown in FIG. 17, different from the above mentioned thermal flow sensor 1A, a filter 55 is placed and a protruding blocking part 54 is provided in the inlet passage 43 of the body 41B. In this case, even where an inflow angle of the gas flowing through an inlet port 42 into the body 41B is larger, the inflow angle of the gas flowing in the measuring passage 44 of the body 41B can be restricted to a predetermined range. Accordingly, it is possible to prevent the inflow angle from exerting an influence on the output characteristics shown in FIGS. 6, 8, 10.

It is to be noted that in the thermal flow sensors 1A, 1B, 1C in the present embodiments, the measuring principle is performed in the electric circuit (constructed of the electric components 31–34 provided on the back side of the board 21A) by use of the hot wires 18 and 19. As alternatives, there are a measuring principle using a single hot wire, a measuring principle using three hot wires, and others. A measuring principle using a large number of hot wires may also be used. For the measuring principle using two hot wires, there are a system as mentioned above for controlling to provide a constant temperature difference between the hot wires 18 and 19 while detecting the output from the hot wires 18 and 19 and others and also a system explained in the related art section for detecting a degree of unsymmetry in the temperature distribution by use of the two hot wires. In these regards, the same applies to the thermal flow sensor in which the board 21B mounting thereon the measuring chip 11 is fixed to the body 41A in close contact relation by screws (shown in FIGS. 12 and 13).

What is claimed is:

1. A thermal flow sensor, including:
   a measuring chip provided with a hot wire and an electrode for the hot wire, the electrode being connected to the hot wire;
   a board having a front side on which an electrode for an electric circuit is provided, the electrode being connected to the electric circuit for performing a measuring principle using the hot wire;
   a body to which the measuring chip is attached in close contact relation to form a main passage,
   wherein at least one of the measuring chip and the board is formed with a groove, and a sensor passage in relation to the main passage is formed by the groove between the measuring chip and the board in a state where the measuring chip is mounted on the board with the hot wire electrode being joined to the electric circuit electrode, the sensor passage including an inlet and an outlet opening toward a surface of the board, through which a fluid flows in and out of the sensor passage, and the hot wire is laid across the sensor passage.

2. The thermal flow sensor according to claim 1, wherein only the measuring chip is formed with the groove.

3. The thermal flow sensor according to claim 1, wherein only the board is formed with the groove.

4. The thermal flow sensor according to claim 1, wherein both the measuring chip and the board are formed with the grooves.

5. The thermal flow sensor according to claim 1, wherein the electric circuit is provided on a back side of the board.

6. The thermal flow sensor according to claim 5, wherein the hot wire is provided in a downstream part of the sensor passage.

7. The thermal flow sensor according to claim 5, further including a bottom plate placed in the body, the bottom plate being used to change a sectional area of the main passage.

8. The thermal flow sensor according to claim 6, further including a bottom plate placed within the body, the bottom plate being used to change a sectional area of the main passage.

9. The thermal flow sensor according to claim 1, wherein the hot wire is provided in a downstream part of the sensor passage.

10. The thermal flow sensor according to claim 9, further including a bottom plate placed within the body, the bottom plate being used to change a sectional area of the main passage.

11. The thermal flow sensor according to claim 1, further including a bottom plate placed within the body, the bottom plate being used to change a sectional area of the main passage.

12. A thermal flow sensor including:
    a measuring chip provided with a hot wire and an electrode for the hot wire, the electrode being connected to the hot wire;
    an electric circuit electrode pin connected to an electric circuit for performing a measuring principle using the hot wire;
    a board in which the electrode pin is inserted;
    an elastic body which provides a seal between the electric circuit electrode pin and the board; and
    a body in which the board is attached in close contact relation to form a main passage;
    wherein a sensor passage in relation to the main passage is formed in a long slot shape by a thickness of the elastic body between the measuring chip and the board in a state where the measuring chip is mounted on a front side of the board with the hot wire electrode being joined to a flat head of the electric circuit electrode pin, and the hot wire is laid across the sensor passage.

13. The thermal flow sensor according to claim 12, wherein the measuring chip is formed with a groove which is used as a part of the sensor passage.

14. The thermal flow sensor according to claim 13, wherein the electric circuit is provided on a back side of the board.

15. The thermal flow sensor according to claim 13, wherein the hot wire is provided in a downstream part of the sensor passage.

16. The thermal flow sensor according to claim 13, further including a bottom plate placed in the body, the bottom plate being used to change a sectional area of the main passage.

17. The thermal flow sensor according to claim 14, wherein the hot wire is provided in a downstream part of the sensor passage.

18. The thermal flow sensor according to claim 17, further including a bottom plate placed in the body, the bottom plate being used to change a sectional area of the main passage.

19. The thermal flow sensor according to claim 15, further including a bottom plate placed in the body, the bottom plate being used to change a sectional area of the main passage.

20. The thermal flow sensor according to claim 12, wherein the board is formed with a groove which is used as a part of the sensor passage.

21. The thermal flow sensor according to claim 20, wherein the electric circuit is provided on a back side of the board.

22. The thermal flow sensor according to claim 20, wherein the hot wire is provided in a downstream part of the sensor passage.

23. The thermal flow sensor according to claim 20, further including a bottom plate placed in the body, the bottom plate being used to change a sectional area of the main passage.

24. The thermal flow sensor according to claim 21, wherein the hot wire is provided in a downstream part of the sensor passage.

25. The thermal flow sensor according to claim 24, further including a bottom plate placed in the body, the bottom plate being used to change a sectional area of the main passage.

26. The thermal flow sensor according to claim 22, further including a bottom plate placed in the body, the bottom plate being used to change a sectional area of the main passage.

27. The thermal flow sensor according to claim 12, wherein both the measuring chip and the board are formed with grooves which are used as parts of the sensor passage.

28. The thermal flow sensor according to claim 27, wherein the electric circuit is provided on a back side of the board.

29. The thermal flow sensor according to claim 27, wherein the hot wire is provided in a downstream part of the sensor passage.

30. The thermal flow sensor according to claim 27, further including a bottom plate placed in the body, the bottom plate being used to change a sectional area of the main passage.

31. The thermal flow sensor according to claim 28, wherein the hot wire is provided in a downstream part of the sensor passage.

32. The thermal flow sensor according to claim 31, further including a bottom plate placed in the body, the bottom plate being used to change a sectional area of the main passage.

33. The thermal flow sensor according to claim 29, further including a bottom plate placed in the body, the bottom plate being used to change a sectional area of the main passage.

34. The thermal flow sensor according to claim 12, wherein the electric circuit is provided on a back side of the board.

35. The thermal flow sensor according to claim 34, wherein the hot wire is provided in a downstream part of the sensor passage.

36. The thermal flow sensor according to claim 34, further including a bottom plate placed in the body, the bottom plate being used to change a sectional area of the main passage.

37. The thermal flow sensor according to claim 35, further including a bottom plate placed in the body, the bottom plate being used to change a sectional area of the main passage.

38. The thermal flow sensor according to claim 12, wherein the hot wire is provided in a downstream part of the sensor passage.

39. The thermal flow sensor according to claim 38, further including a bottom plate placed in the body, the bottom plate being used to change a sectional area of the main passage.

40. The thermal flow sensor according to claim 12, further including a bottom plate placed in the body, the bottom plate being used to change a sectional area of the main passage.

* * * * *